J. W. ANDERSON.
MULTIPLE VIEW CAMERA.
APPLICATION FILED NOV. 26, 1919.
1,369,515.
Patented Feb. 22, 1921.
3 SHEETS—SHEET 3.
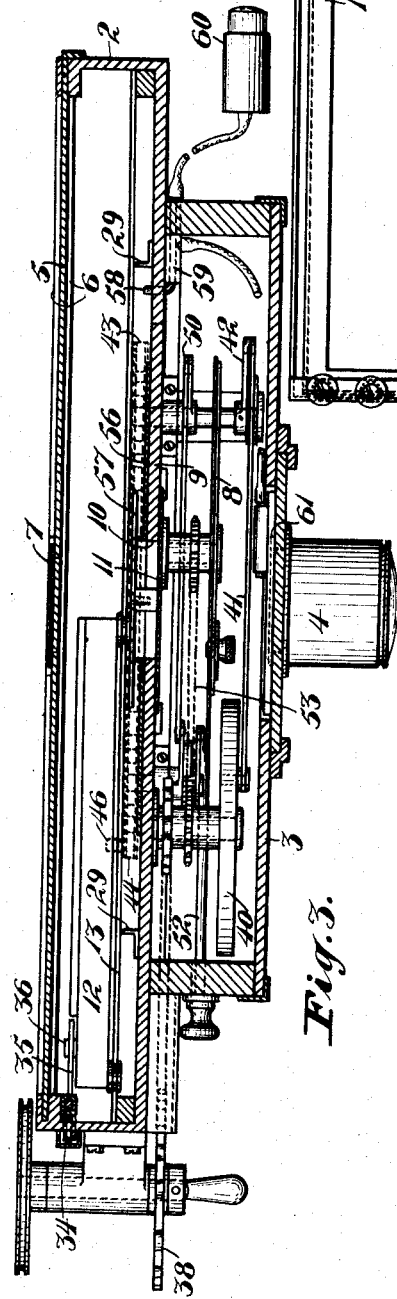
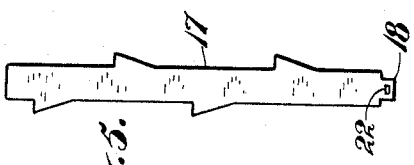
INVENTOR
James W. Anderson

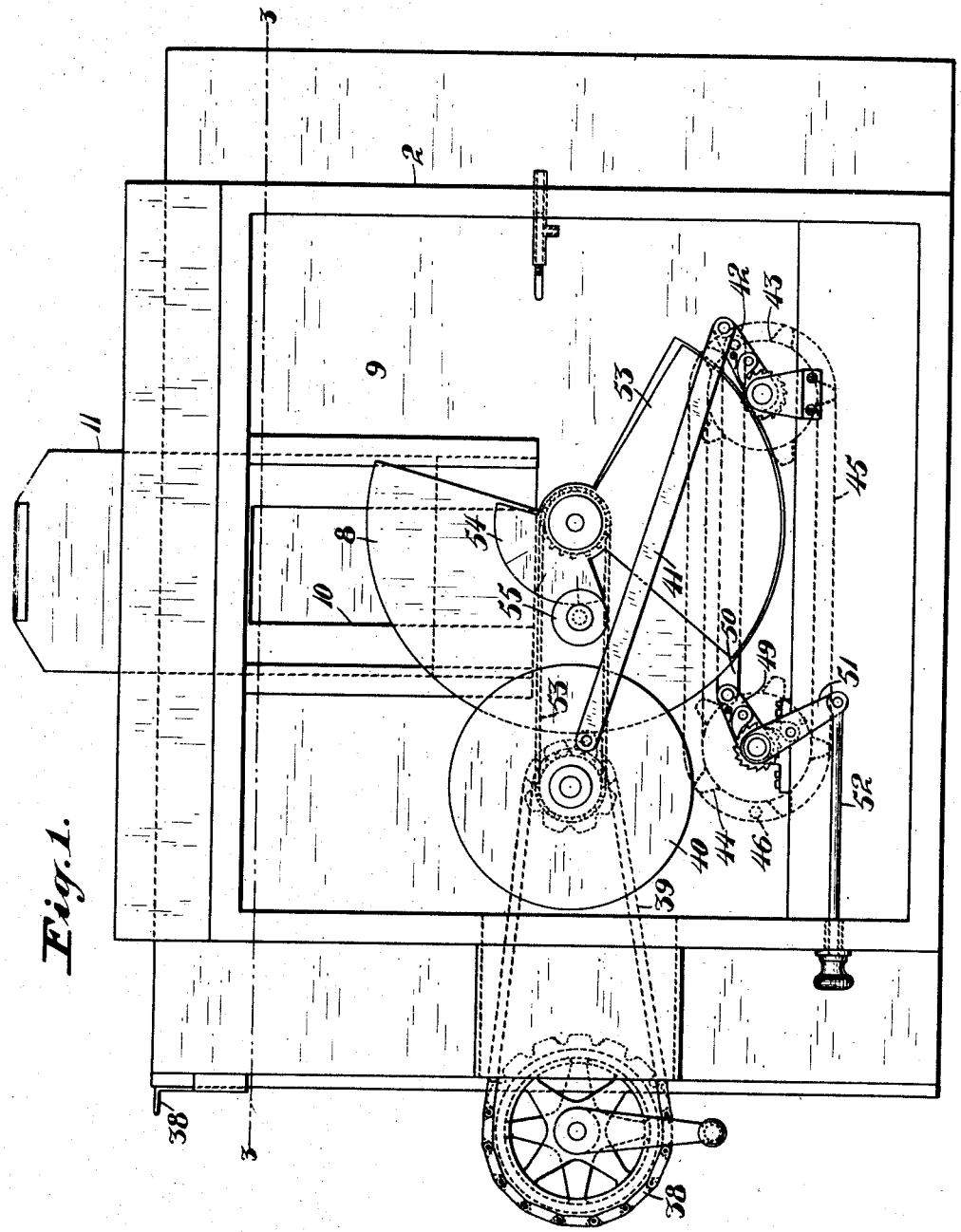

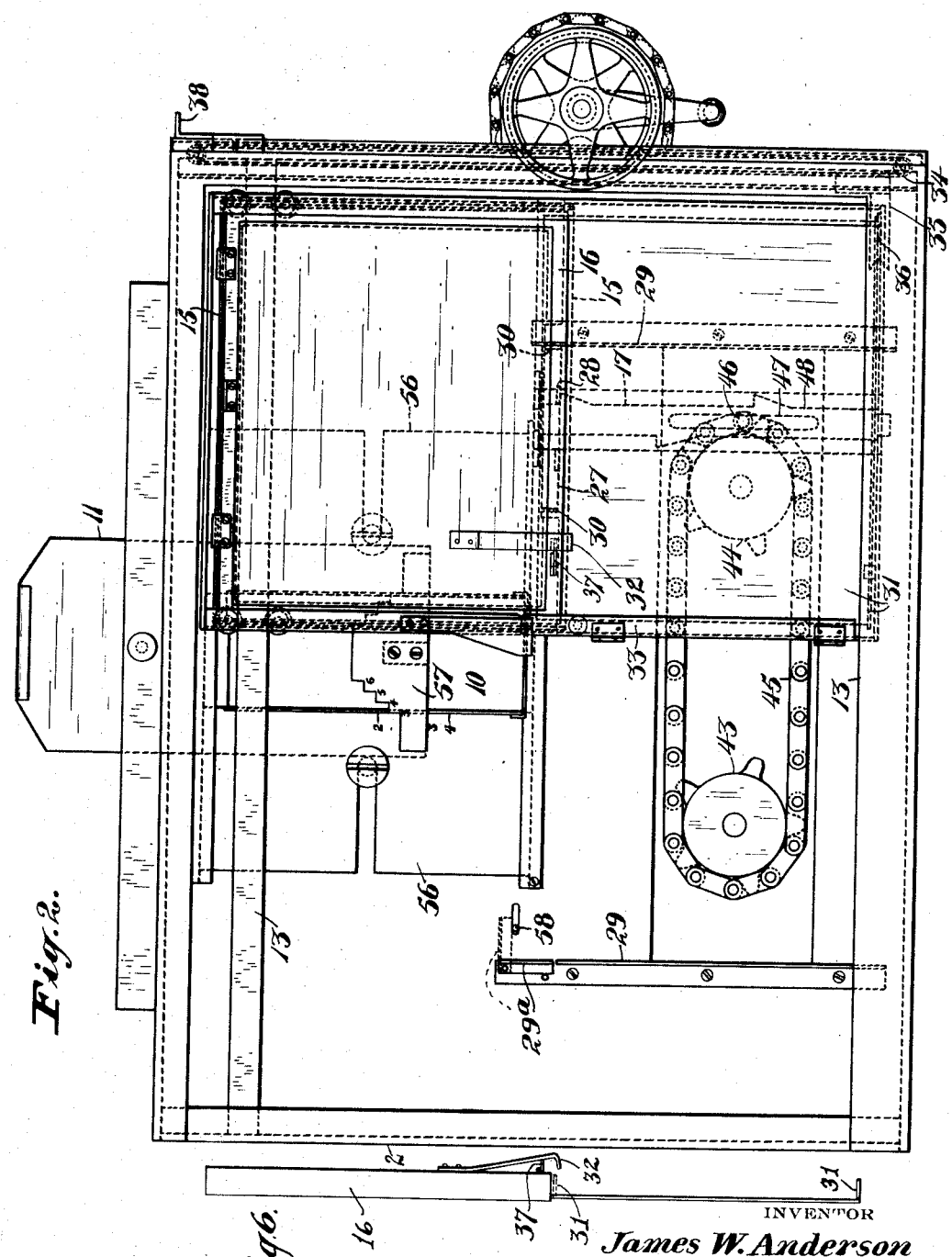

UNITED STATES PATENT OFFICE.

JAMES W. ANDERSON, OF SAN FRANCISCO, CALIFORNIA, ASSIGNOR TO ANDERSON MANUFACTURING CO., A CORPORATION OF CALIFORNIA.

MULTIPLE-VIEW CAMERA.

1,369,515.      Specification of Letters Patent.      Patented Feb. 22, 1921.

Application filed November 26, 1919. Serial No. 340,723.

*To all whom it may concern:*

Be it known that I, JAMES W. ANDERSON, a citizen of the United States, residing at San Francisco, in the county of San Francisco and State of California, have invented new and useful Improvements in Multiple-View Cameras, of which the following is a specification.

This invention relates to multiple view cameras of the dry plate type, wherein a horizontally shiftable frame carries a plate holder, the latter being mounted for vertical movement therein, and controlled by escapement mechanism, whereby when the shiftable frame reaches the ends of its reciprocating movement the plate and holder are lowered one step to present a new portion of the sensitized surface for exposure on the return movement of the shiftable frame. The shiftable frame is given an intermittent movement which is timed in relation to the movement of a rotary shutter so that when the aperture in the latter uncovers the sensitized plate, the said plate is stationary.

It is the object of the present invention to simplify and improve the construction and operation of a camera of this type.

One form which my invention may assume is exemplified in the following specification and illustrated in the accompanying drawings, wherein:

Figure 1 shows a front elevation of the camera with the front side thereof removed.

Fig. 2 shows a rear elevation of the same with the rear side removed.

Fig. 3 shows a horizontal sectional view taken on the line 3—3 of Fig. 1.

Fig. 4 shows a side elevation of the horizontally shiftable frame which carries also a vertically movable frame to receive the plate holder.

Fig. 5 shows a side elevation of a toothed rack used in connection with the escapement mechanism for the vertically movable frame.

Fig. 6 shows a side elevaton of the vertical slidable frame.

The camera as shown in Figs. 1 and 2 comprises a suitable box or casing 2 having a front 3 to which is attached a lens 4 or others suitable camera apparatus. A removable back 5 is slidable in guides 6 and has a focusing aperture or window normally closed by a slide 7. Within the box behind the lens is a rotary shutter 8 through which light may pass intermittently from the lens to a sensitized plate at the rear thereof. The shutter is preferably journaled upon a shaft secured to a vertical wall or partition 9 in the box, said wall dividing the box longitudinally. Formed in said wall is an aperture 10, which is controlled by means of vertical slide 11. Immediately in the rear of the partition wall 9 is a reciprocating carriage mechanism comprising a laterally shiftable frame 12 slidable on horizontal rails or guides 13 at the top and bottom of the housing and operated by driving mechanism hereinafter described. A vertically slidable frame 15 is carried by the shifting frame 12 and removably receives a plate holder 16, the latter adapted to contain a sensitized dry plate. The vertical dimension of the plate holder frame is such that it may be elevated bodily to the upper portion of the carriage frame so that the bottom edge of the sensitized plate within the holder becomes approximately even with the bottom of the aperture 10 in the wall 9.

At the front of the carriage frame is a vertical toothed rack 17 detachably held thereon by means of a projection 18 at the lower end entering an aperture in the bottom of the frame and the upper end entering a slot in a horizontal bar 20 fixed upon the carriage frame intermediate the top and bottom thereof. A spring clip 21 on the bottom of the carriage frame has a lug to enter an opening 22 in the projection 18, and serves to hold the toothed rack in place.

The plate-holder frame 15 has on its lower portion a slidable bar 27 carrying at each end an inwardly directed lug or detent 28. The spacing of the detents is equal to the width of the rack and one tooth, and at each end of the movement of the carriage frame is a flange 29 fixed to the partition wall 9 and which is adapted to be engaged by a lug 30 on the slidable bar 27, whereby the latter is shifted in a direction to release one of the detents from its tooth and allow the plate-holder and frame to drop downwardly until the detent on the opposite side strikes a tooth. Thereby the plate-holder frame is lowered the distance of one tooth at each end of movement of the carriage.

Slidable over the front of the plate-holder so as to effectually cover the sensitized plate within is a slide 31 which may be locked in closed position by a suitable catch 32. The plate holder with the slide in place is placed within the frame 15 and fastened therein by means of a hinged flange 33 formed on one of the vertical, channel-shaped guides of the frame 12. Thereafter the carriage mechanism is moved to the left-hand side of the housing and plate-holder and vertically slidable frame are raised to the upper limit of their movement. An endless chain 34 is positioned at the left end of the housing and carries a bifurcated member 35 so positioned as to be engaged by a lug 36 on the slide 31. The said bifurcated member has a hook-shaped lower end to engage beneath the catch 32 for this purpose. When the plate-holder has been raised to its upward limit of movement it will be held in position by means of the toothed bar 17 and detents 28. The catch 32 which holds the slide in place is then released by means of a cam 37, and thereupon the slide may be lowered by operating the chain 34, which for this purpose has a handle 38 disposed outside of the housing. Thereafter as the carriage mechanism is reciprocated through suitable operating mechanism the plate-holder will be successively lowered from tooth to tooth through the escapement mechanism already described. On account of the detachability of the toothed rack 17 other racks having a different number of teeth may be readily substituted whereby to divide the sensitized plate into different spacings for the accommodation of a greater or less number of horizontal rows of exposures.

The operating mechanism for the shiftable frame 12 comprises a driving sprocket wheel 38 journaled outside the housing and driven by a hand-crank or motor. A sprocket chain 39 connects the said wheel 38 with a fly wheel 40 journaled within the housing. A connecting rod 41 extends from the fly wheel 40 to a rock arm 42, which latter, through suitable pawl and ratchet mechanism, imparts an intermittent movement to a sprocket wheel 43. Spaced horizontally from the sprocket wheel 43 is a similar wheel 44 and over both of said wheels a chain 45 is arranged. This chain 45 has a laterally extending pin or lug 46 on its rear side working in a vertical slot 47 formed in a vertical pose or bar 48 fixed to the shiftable frame 12. Thereby as the chain 45 is driven, the said frame 12 is carried along therewith step by step from one end of the camera housing to the other. I prefer to drive the second sprocket wheel 44 positively and for this purpose I show a rock arm 49 mounted upon the shaft of said sprocket wheel 44 and carrying suitable pawl mechanism to intermittently actuate a ratchet on the shaft of said wheel. This rock arm 49 is operated by means of a connecting rod 50 which extends to the first mentioned rock arm 42. I show on the shaft of the second sprocket wheel 44 a crank arm 51 to which is connected a rod 52 extending through the end of the housing and formed at its exterior end with a handle. This crank arm 51 has a pawl to engage the ratchet wheel on the shaft of said sprocket wheel and thereby the said sprocket wheel may be actuated by hand by reciprocating the rod 52. This is advantageous where it is desired to shift the position of the frame 12 a slight distance. The provision of the fly wheel 40 increases the momentum of the operating mechanism so that the pawl and ratchet feed may be operated without too much of a jerk.

The shutter 8 is shown as driven by a chain 53 from a sprocket wheel on the shaft of the fly wheel 40. Thereby, it is obvious that the operation of the shutter and shiftable frame 12 may be so timed that when the aperture in the shutter uncovers the sensitized plate, the said frame 12 will not be in motion, the rock arms 42 and 49 at this time being on their back stroke. The opening of the shutter 8 is made adjustable by providing a movable segment 53 formed on its inner end with an arcuate plate 54 coöperating with a thumb screw 55, the latter being connected to the shutter proper. By slacking the thumb screw, the movable segment 53 may be turned to partially or entirely close the aperture in the shutter. The aperture 10 behind the shutter is, of course, adjustable as to height by means of the slide 11. I provide additional means whereby the width of this aperture may be adjusted, said means comprising a pair of horizontally slidable plates 56. The lower end of the slide 11 carries a plate 57 stepped at each end and graduated. This stepped and graduated plate provides a convenient means for adjusting the plates 56 so that one will not be opened or closed more than the other.

Cameras of this type are extensively used for portrait work, the advantage being that a series of different poses are then photographed quickly, which insures a better chance of obtaining one suitable to the subject. The best results are obtained when the subject is at ease, which in a majority of cases is insured only when he is unaware of the fact that he is being photographed. Persons uninitiated are apt to show considerable lack of poise and nervousness the instant the cranking of the camera starts. To overcome this, I provide an attachment whereby the carriage mechanism may be put in operation or kept continuously in operation without operating the escapement mechanism for the plate holder and without in any way exposing the sensitized plate to the light. In this way the subject becomes accustomed to the clicking of the machine, and having been assured that he is not being photographed as yet, he becomes more natural in his position. Then when he is at ease, the operator presses a bulb unbeknown to the subject and the camera starts photographing. This is done by cutting away the upper portion of the flange 29 at the right-hand side of the machine when viewing the latter from the front. This portion, which is indicated by the numeral 29ª, is hinged so that it may be swung up to miss the lug 30 on the escapement mechanism. In this connection, it should be understood that the racks 17 are so made that the uppermost tooth is on the left-hand side thereof, and therefore to lower the plate-holder the escapement mechanism must be shifted to the left by contact with the flange 29 at the right-hand side of the machine. The hinged portion 29ª is held in raised position by means of a pin 58 extending through a slot in the partition wall 9 and formed on the end of a plunger 59, which plunger is operated by a pneumatic bulb 60. Pressure on the bulb forces the plunger outwardly and drives the pin 58 from under the hinged member, allowing the latter to drop down and form an obstruction for the escapement mechanism whereby to operate the latter. The same bulb 60 also controls a lens shutter 61 after the manner of ordinary cameras, so that no light is admitted through the lens until the hinged member 29ª is dropped into place to release the escapement mechanism.

Various changes in the construction and arrangement of the several parts may be employed without departing from the spirit of my invention as disclosed in the appended claims.

Having thus described my invention, what I claim and desire to secure by Letters Patent is:

1. In a multiple view camera, a holder for a photographic plate, means for imparting thereto a horizontal reciprocating movement, means automatically effective at the end of the horizontal movement to cause the plate holder to be shifted in a vertical direction, and manually actuated means to render the vertical shifting means inoperative while the plate holder continues to be reciprocated horizontally.

2. In a multiple view camera, a holder for a photographic plate, means for imparting thereto a horizontal reciprocating movement, means automatically effective at the end of the horizontal movement to cause the plate holder to be shifted in a vertical direction, means to control the initial operation of the vertical shifting means, and actuating means exterior of the camera for said controlling means, whereby the vertical shifting means may be rendered inoperative while the plate holder continues to be reciprocated horizontally.

3. In a multiple view camera, a holder for a photographic plate, means for imparting thereto a horizontal reciprocating movement, means automatically effective at the end of the horizontal movement to cause the plate holder to be shifted in a vertical direction, said vertical shifting means being initially inoperative during the reciprocation of the plate-holder, and means controlled from the exterior of the camera to render the same operative at will.

4. In a multiple view camera, a holder for a photographic plate, means for imparting thereto a horizontal reciprocating movement, means operable at the end of the horizontal movement to shift the plate holder in a vertical direction, a shutter to control the admission of light to the plate, and means effective when the shutter is closed to render the vertical shifting means inoperative, said means being actuated simultaneously with the opening of the shutter to restore the vertical shifting means to operative position.

5. In a multiple view camera, a holder for a photographic plate, means for imparting thereto a horizontal reciprocating movement, escapement means operable at the end of the horizontal movement to allow the plate holder to drop whereby to present a new surface for exposure on the return movement, a trip device for the escapement means movable out of operative relation therewith, means to retain the trip device in inoperative position, and means actuated from the exterior of the camera to release the retaining means.

6. In a multiple view camera, a holder for a photographic plate, means for imparting thereto a horizontal reciprocating movement, escapement means operable at the end of the horizontal movement to allow the plate holder to drop whereby to present a new surface for exposure on the return movement, a trip device for the escapement means movable out of operative relation therewith, means to retain the trip device in inoperative position, a shutter to control the admission of light to the plate, and unitary means for opening the shutter and simultaneously releasing the retaining device.

7. In a multiple view camera, a holder for a photographic plate, and means for imparting thereto a horizontal reciprocating movement, said means comprising a pair of sprocket wheels, an endless chain thereon, a ratchet wheel for each of said sprocket wheels, a pawl carrying rock-arm for each ratchet wheel for operating the latter intermittently, a connecting rod between the rock-arms, and means for actuating one of said rock-arms.

8. In a multiple view camera, a holder for a photographic plate, means for imparting thereto an intermittent horizontal and vertical movement, a slide for the plate holder whereby to protect the photographically sensitive plate from the light when inserting and removing the plate holder, and means operated from the exterior of the camera to lower the slide and expose the plate when the plate holder is in starting position within the camera, said last mentioned means comprising an endless chain and a member on the chain to engage a projection on the slide.

In testimony whereof I have hereunto set my hand in the presence of two subscribing witnesses.

JAMES W. ANDERSON.

Witnesses:
　JOHN H. HERRING,
　W. W. HEALEY.